W. G. KENNEDY.
COLLAR.
APPLICATION FILED NOV. 21, 1911.

1,081,121.

Patented Dec. 9, 1913.

Witnesses:
Carroll Bailey.

Inventor:
W. G. Kennedy,
By Victor J. Evans.
Attorney.

UNITED STATES PATENT OFFICE.

WILLIAM G. KENNEDY, OF MATADOR, TEXAS.

COLLAR.

1,081,121.  Specification of Letters Patent.  Patented Dec. 9, 1913.

Application filed November 21, 1911. Serial No. 661,550.

*To all whom it may concern:*

Be it known that I, WILLIAM G. KENNEDY, a citizen of the United States, residing at Matador, in the county of Motley and State of Texas, have invented new and useful Improvements in Collars, of which the following is a specification.

An object of the invention is to provide a collar for use in connection with draft animals to ease the pulling effect of the load upon the shoulders of the animal.

In the use of collars for draft animals, the collar is mounted to encircle the neck of the animal and rests against the shoulders of the animal and the hames are then connected to the collar, the load being connected to the hames by means of suitable traces or the like, so that the pulling effect of the load will come directly on the collar and the shoulders of the animal. A large number of collars now generally used are made of a stiffened material and are not provided with sufficient flexibility to enable the collar to conform to the shoulders of the animal, thus preventing the animal from pulling a heavy load, whereas if the collar conforms closely to the shoulders of the animal a greater bearing surface is obtained and the animal can thus more easily pull a heavy load.

In my device I aim to provide a collar which is constructed with sufficient flexibility to permit of the collar adjusting itself to the shoulders of the animal and which owing to its flexibility and construction will be more durable than the collars now used.

For the purpose mentioned, use is made of a casing having a helical spring extending therethrough, the ends of the spring being flattened at the ends of the casing for securing suitable connecting members thereto and a flexible rod mounted within the casing and encircled by the said helical spring, the said casing having suitable pads secured thereto and arranged to encircle the neck of an animal and repose upon the shoulders thereof.

Reference is to be had to the accompanying drawings constituting a part of this specification, in which similar characters of reference denote corresponding parts in all the views, and in which—

Figure 1:
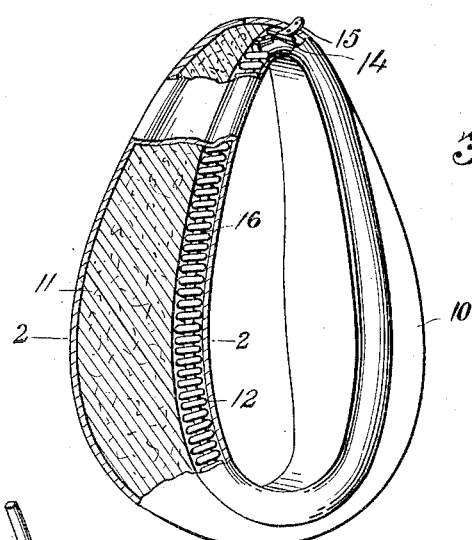
Figure 4:
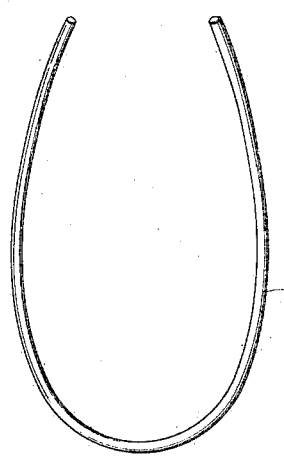
Figure 3:
Figure 2:
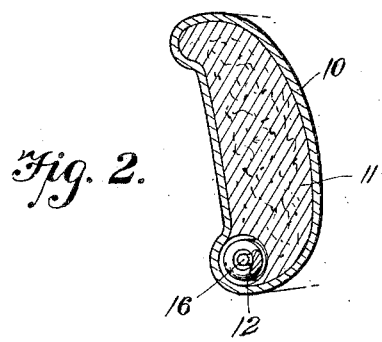

Figure 1 is a perspective view of my collar, parts being broken away to disclose the underlying structure. Fig. 2 is a horizontal sectional view taken on the line 2—2 in Fig. 1. Fig. 3 is a fragmentary perspective view of one of the ends of the helical spring. Fig. 4 is a perspective view of the flexible rod mounted within the casing.

Referring more particularly to the views, I provide a casing 10, preferably consisting of leather or some soft material and secured to the said casing are suitable pads 11, the said pads being similar to the pads now generally used on horse collars. Mounted within the casing 10 is a helical spring 12 having flattened ends 13 terminating at the ends of the casing 10 to permit of securing a buckle 14 to one of the ends and a strap 15 to the other end. Mounted within the helical spring 12 and encircled thereby is a flexible reinforcing rod 16, the ends of the said rod being disposed adjacent the ends of the said spring.

In the use of my device, the strap 15 is disengaged from the buckle 14 and by pulling the free ends of the casing outwardly, the collar can be mounted to encircle the neck of an animal, after which the strap 15 is reëngaged with the buckle 14. Suitable hames or the like are now connected to the collar in the usual manner and by means of traces connection is made with a load. Now when the animal moves forwardly, the strain of the load comes directly on the collar and the collar being flexible, due to the provision of the helical spring 12 and the rod 16, will conform to the shape of the shoulders of the animal so that the greatest possible bearing will be presented to the shoulders, thus enabling the animal to draw heavy loads more easily than when portions of the collar contacted directly with the shoulders of an animal.

I claim:—

As a new article of manufacture, a collar comprising a collar casing, a helical spring mounted within the said casing and terminating in flattened apertured ends, a buckle secured to one of the apertured ends of the spring, a strap secured to the other apertured end of the spring, with the said strap and buckle adapted for connection with each other, and a U-shaped flexible reinforcing rod arranged in the said casing and encircled by the said spring, with the ends of the said rod lying adjacent to the flattened ends of the said spring.

In testimony whereof I affix my signature in presence of two witnesses.

WILLIAM G. KENNEDY.

Witnesses:
H. C. KENNEDY,
AARON W. BEAUCHAMP.

Copies of this patent may be obtained for five cents each, by addressing the "Commissioner of Patents, Washington, D. C."